US012779360B2

(12) United States Patent
Zhan et al.

(10) Patent No.: US 12,779,360 B2
(45) Date of Patent: Nov. 3, 2026

(54) COOLING DEVICE AND COOLING METHOD FOR MALTOL SUBLIMATION SECTION

(71) Applicant: ANHUI JINHE INDUSTRIAL CO., LTD., Chuzhou City (CN)

(72) Inventors: Jian Zhan, Chuzhou City (CN); Jinlin Chen, Chuzhou City (CN); Jianfang Xiao, Chuzhou City (CN)

(73) Assignee: ANHUI JINHE INDUSTRIAL CO., LTD., Chuzhou City (CN)

( * ) Notice: Subject to any disclaimer, the term of this patent is extended or adjusted under 35 U.S.C. 154(b) by 540 days.

(21) Appl. No.: 18/207,726

(22) Filed: Jun. 9, 2023

(65) Prior Publication Data

US 2023/0311024 A1 Oct. 5, 2023

Related U.S. Application Data

(63) Continuation of application No. PCT/CN2021/137216, filed on Dec. 10, 2021.

(30) Foreign Application Priority Data

Dec. 11, 2020 (CN) ......................... 202011451921.1

(51) Int. Cl.
*B01D 7/02* (2006.01)

(52) U.S. Cl.
CPC ..................................... *B01D 7/02* (2013.01)

(58) Field of Classification Search
CPC .................................... B01D 7/00; B01D 7/02
See application file for complete search history.

(56) References Cited

U.S. PATENT DOCUMENTS 2,993,764 A 7/1961 Grulet et al.

FOREIGN PATENT DOCUMENTS

| | | | |
|---|---|---|---|
| CN | 102671412 | A | 9/2012 |
| CN | 102671415 | A | 9/2012 |
| CN | 202709776 | U | 1/2013 |
| CN | 208244148 | U | 12/2018 |
| CN | 210030506 | U | 2/2020 |
| CN | 112742061 | A | 5/2021 |
| GB | 1275232 | A | 5/1972 |

*Primary Examiner* — Amber R Orlando
(74) *Attorney, Agent, or Firm* — IPro, PLLC; Na Xu

(57) ABSTRACT

The invention provides a cooling device and a cooling method for a sublimation section. The cooling device comprises a reaction kettle (1) provided with a smooth inner wall, wherein the top of the reaction kettle (1) is provided with a gas phase port (11), the bottom of the reaction kettle (1) is provided with a discharge port (12), the middle of the reaction kettle (1) is provided with a sublimation gas phase inlet (13), and a wall of the reaction kettle (1) is further provided with a jacket (2).

3 Claims, 2 Drawing Sheets

COOLING DEVICE AND COOLING METHOD FOR MALTOL SUBLIMATION SECTION

This application claims the priority of a Chinese patent application with application date of Dec. 11, 2020 and application number of 202011451921.1, titled as cooling device and cooling method for maltol sublimation section.

TECHNICAL FIELD

The present invention relates to a cooling device and a cooling method for maltol sublimation section.

BACKGROUND

During a production process of maltol (methyl or ethyl), purification is carried out in the sublimation section such that the material is sublimated into gaseous state, after that, cooling and water absorption is carried out such that the material becomes into aqueous solution, cooling the aqueous solution again in low temperature such that the material becomes into solid, dehydrating the material with a centrifuge, and taking out the material for use in a next section.

Chinese patent document CN108355372A discloses a sublimation receiving method of maltol, in which a method is adopted that steam material is contacted and absorbed with the cooling water in a receiving kettle after the sublimation steam enters the receiving kettle.

Chinese patent document CN208244148U discloses a sublimation reaction device in production of ethyl maltol, comprising a sublimation kettle and a receiving tank connected by a pipeline between the sublimation kettle and the receiving tank, the pipeline is sleeved with a titanium condensing tube which includes a condensing tube and a jacketed tube. The condensing tube is a linear transparent tube body. Both ends of the condensing tube are connected to the pipeline through flanges. A central axis of the linear transparent tube body is parallel to a central axis of the pipeline. Several partitions are equidistantly provided along axial direction in the condensing tube. A plurality of through holes is uniformly provided on the partitions. The jacketed tube is provided outside the condensing tube, and closed annular space is formed between the jacketed tube and the condensing tube.

The above patent documents are conventional sublimation treatment mode of maltol (methyl or ethyl), in all of which the sublimated gas is dissolved in water. Maltol needs to be further separated after being absorbed by cooling water, which may introduce impurities, and itself needs to be separated from water, resulting in low production efficiency and high separation cost. Cooling and absorbing material with water requires a large amount of water. Because the material is cooled by a freezing kettle and then is treated by centrifugal dehydration, a large amount of sewage pollution is formed. At the same time, a lot of manpower and material resources are wasted because of centrifugal dehydration. A pipe is often blocked when the material is put into the centrifuge, such that the pipe needs to be disassembled and clean, which not only wastes a lot of manpower and material resources, but also causes material pollution and waste, while a lot of odor will be generated during centrifugal dehydration, causing environmental pollution.

SUMMARY

First technical problem to be solved by the present invention is to provide a cooling device for maltol sublimation section, which is simple in structure, easy to use, simplifies process, and improves production efficiency.

Second technical problem to be solved by the present invention is to provide a cooling method for the above-mentioned cooling device for maltol sublimation section, which avoids using water to cool as used in the prior art, does not produce a large amount of sewage, and saves resources.

For solving above-mentioned first technical problem, the invention provides a cooling device for maltol sublimation section, comprising a reaction kettle provided with enameled inner wall, said reaction kettle is in cylindrical shape vertically arranged, side wall and bottom wall of the reaction kettle are provided with a jacket, a position of the jacket corresponding to a lower part of the reaction kettle is provided with a condensed water inlet, a position of the jacket corresponding to an upper part of the reaction kettle is provided with a condensed water outlet, a top wall of the reaction kettle is provided with a gas phase port running through the top wall, a bottom wall of the reaction kettle is provided with a discharge port running through the bottom wall, a discharge butterfly valve is provided on the discharge port, the surface of the discharge butterfly valve is covered with PTFE, a middle of the reaction kettle in height direction is provided with a sublimation gas phase inlet running through the side wall of the reaction kettle, the upper part of the reaction kettle is provided with four circular throttle plates with enameled surface arranged at intervals up and down. The diameter of the throttle plate matches the inner diameter of the reaction kettle. The throttle plate is a hollow plate, and an inner cavity of the throttle plate is connected to the jacket. A middle part of each throttle plate is provided with a first through hole vertically penetrating through the throttle plate, and each throttle plate is also provided with a number of second through holes arranged around the first through hole. A motor is arranged above the reaction kettle. A rotating shaft of the motor extends vertically downward into the reaction kettle, and passes through all first through holes in sequence. A lower end of the rotating shaft is located at the lower part of the reaction kettle, and the lower end of the rotating shaft is provided with a stirring paddle, which is made of stainless steel and coated with PTFE outside. A scraper matching with the throttling plate is provided on a position of the rotating shaft corresponding to an upper side of each throttling plate.

For the sake of simplicity, the cooling device for the maltol sublimation section described hereinafter is referred to as the present device.

Advantages of the present device: the present device is simple in structure, easy to use, simplifies the process, and improves production efficiency.

For solving above-mentioned second technical problem, the present invention provides a cooling method for the cooling device of maltol sublimation section, comprising the following steps:

(1) introducing cooling water of −10° C. to −15° C. into an inner cavity of a throttle plate and a jacket through a condensate water inlet and a condensate water outlet, and starting a motor for stirring, while connecting a vacuum pump to a gas phase port to vacuumize a reaction kettle to ensure that vacuum degree in the reaction kettle is −0.08 MPa to −0.095 MPa;

(2) starting sublimation in a sublimation kettle, introducing the sublimated material in gas phase directly into the reaction kettle through a gas phase inlet and holing for 4 h;

(3) introducing the sublimated material in gas phase into the reaction kettle and condensing it into solid material, scraping off the solid material adhered to an upper side of the throttle plate by a scraper such that the solid material falls into a bottom of the reaction kettle through a second through holes;

(4) finally, opening butterfly valve at the discharge port to release the solid material into the next process.

A cooling device for sublimation section comprises a reaction kettle provided with a smooth inner wall, a top of the reaction kettle is provided with a gas phase port, a bottom of the reaction kettle is provided with a discharge port, a middle of the reaction kettle is provided with a sublimation gas phase inlet, and a wall of the reaction kettle is further provided with a jacket.

Further, a throttle plate with enameled surface is provided in the reaction kettle, a first through hole passed vertically through the throttle plate is provided at a middle of the throttle plate, and several second through holes arranged around the first through hole are provided on the throttle plate.

Further, the throttle plate is a hollow plate, and an inner cavity in the throttle plate is connected to the jacket.

Further, a rotating shaft extending downward from the top of the reaction kettle extends vertically downwards into the reaction kettle, and passes through the first through hole, a scraper matching with the throttling plate is provided on a position of the rotating shaft corresponding to an upper side of each throttling plate.

Further, a lower end of the rotating shaft is provided with a stirring paddle.

Further, the stirring paddle is made of stainless steel and coated with PTFE outside, and a position of the rotating shaft corresponding to an upper side of each throttling plate is provided with a scraper matching the throttling plate.

Further, the reaction kettle is in cylindrical shape vertically arranged, the throttle plate is circular, and the diameter of the throttle plate matches the inner diameter of the reaction kettle.

A cooling method using the cooling device for the sublimation section comprises the following steps: (1) introducing cooling water of −10° C. to −15° C. into an inner cavity of a throttle plate and a jacket through a condensate water inlet and a condensate water outlet, and starting a motor for stirring, while connecting a vacuum pump to a gas phase port to vacuumize a reaction kettle to ensure that vacuum degree in the reaction kettle is −0.08 MPa to −0.095 MPa; (2) starting sublimation in a sublimation kettle, introducing the sublimated material in gas phase directly into the reaction kettle through a gas phase inlet and holing for 4 h; (3) introducing the sublimated material in gas phase into the reaction kettle and condensing it into solid material, scraping off the solid material adhered to an upper side of the throttle plate by a scraper such that the solid material falls into a bottom of the reaction kettle through a second through hole; (4) finally, opening butterfly valve at a discharge port to release the solid material into a next process.

A cooling method for sublimation section comprises the following steps: Step 1: vacuumizing a reaction kettle to ensure vacuum degree in a reaction kettle is −0.08 MPa∼−0.095 MPa; Step 2: introducing the sublimated material in gas phase directly into the reaction kettle through a gas phase inlet; Step 3: condensing the sublimated material in gas phase into solid material in the reaction kettle.

Further, in step 3, scraping off the solid material condensed into solid phase and adhered to an upper side of a throttle plate by a scraper such that the solid material falls into the bottom of the reaction kettle.

Further, in step 3, scraping off the solid material adhered to an upper side of a throttle plate by a scraper such that the solid material falls into the bottom of the reaction kettle through second through holes.

Further, in step 1, introducing cooling water of −10° C. to −15° C. into an inner cavity of a throttle plate and a jacket through a condensate water inlet and a condensate water outlet.

For the sake of simplicity, the cooling method using the cooling device for the maltol sublimation section described in the present invention is referred to as the present method.

The advantage of the present method: the sublimation gas phase material is directly cooled into solid state, and is directly sent to a station for use. The disadvantage of the existing sublimation method is avoided, in which water is used to cool down and absorb the material, and then the material is froze and dried by a centrifuge, resulting generation of a lot of sewage and waste of a lot of manpower and material resources. By using the present method, speed is faster, efficiency is higher, production yield is greatly improved, and production cost is saved.

DETAILED DESCRIPTION

Embodiment One

Figure 1:
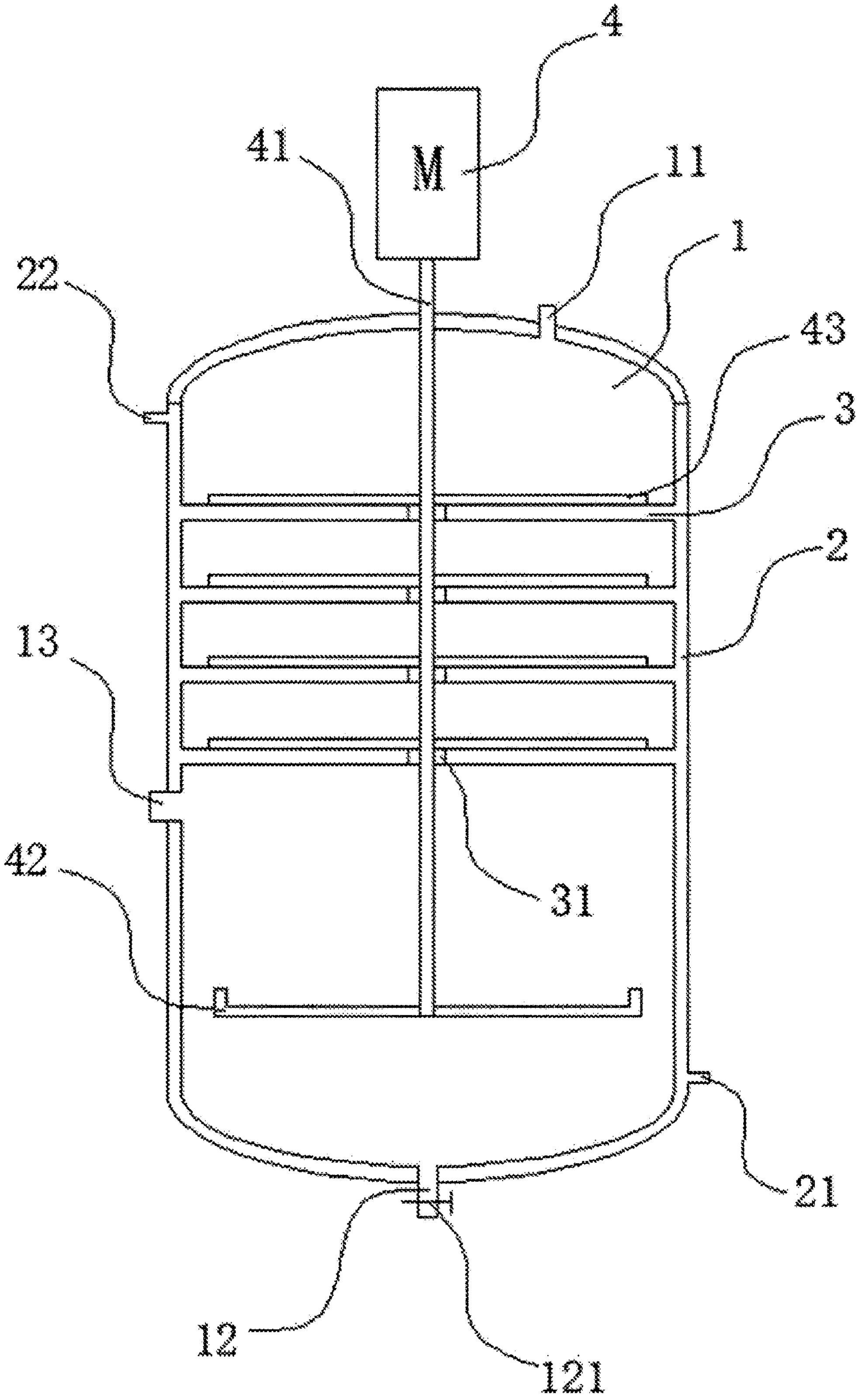
FIG. 1 is a schematic diagram of the structure of the present device.
Figure 2:
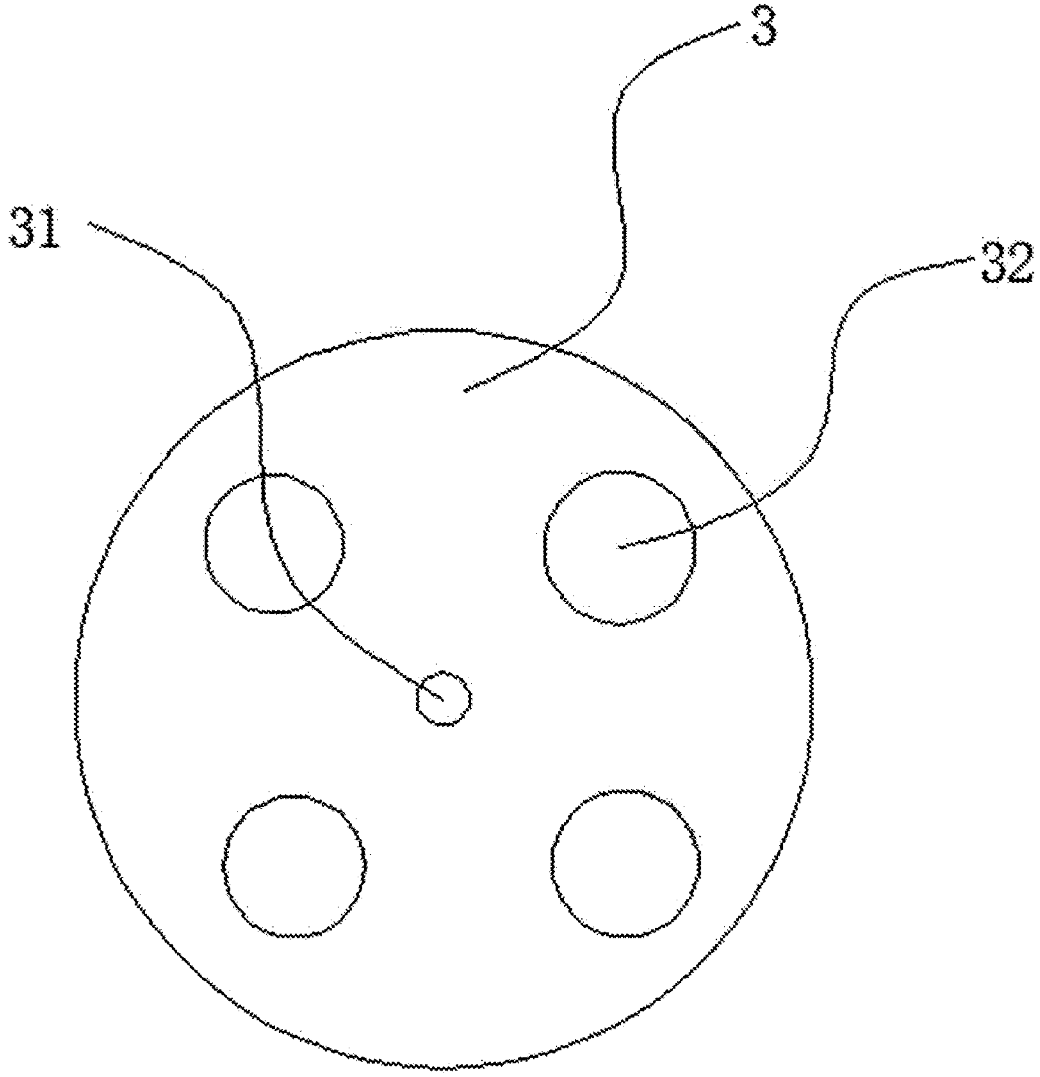
FIG. 2 is a schematic diagram of the structure of the throttle plate of the present device.

Referring to FIG. 1, a cooling device for maltol sublimation section comprises a reaction kettle 1 with an enameled inner wall. The inner wall is treated by enamel material. On the one hand, the reaction kettle needs certain strength to withstand certain external forces so as to ensure normal condensation to be carried out; on the other hand, the enameled inner wall is used to avoid generation of odor because the condensed maltol (containing ethyl maltol) is otherwise generally adhered to the inner wall.

The reaction kettle 1 is in cylindrical shape vertically arranged, a jacket 2 is provided at side wall and bottom wall of the reaction kettle 1, a condensed water inlet 21 is provided at a position of the jacket 2 corresponding to the lower part of the reaction kettle 1, and a condensed water outlet 22*a* is provided at a position of the jacket 2 corresponding to the upper part of the reaction kettle 1. Such structure enables a lower temperature to be formed in the reaction kettle, and sublimed maltol can be condensed on the wall to obtain a solid substance.

A top wall of the reaction kettle 1 is provided with a gas phase port 11 running through the top wall. A gas phase port is connected to a vacuum pump. After the vacuum pump is turned on, a negative pressure can be formed in the reaction kettle. Under the negative pressure of −0.08 MPa∼−0.095 MPa, gaseous substance includes sublimed maltol and gaseous component of the solvent. Solid substance can be obtained after maltol is condensed, and impurity such as gaseous component of the solvent is discharged out of the kettle through pipeline under action of negative pressure and action of extraction. In the case of vacuum negative pressure, sublimation of maltol is a sublimation process under reduced pressure, so sublimation can be achieved at a lower temperature, thus problem caused by high temperature heating sublimation can be reduced, such as product decomposition, decreased yield and increased impurities.

A bottom wall of the reaction kettle 1 is provided with a discharge port 12 running through the bottom wall, a discharge butterfly valve 121 is provided on the discharge port 12, surface of the discharge butterfly valve 121 is covered with PTFE, a middle of the reaction kettle 1 in height direction is provided with a sublimation gas phase inlet 13 running through a side wall of the reaction kettle. Because a sublimation gas phase inlet is provided in the middle of the reaction kettle, after the sublimated maltol in gas phase enters, part of it is condensed quickly, and part of it continues upward under action of negative pressure. As sublimated maltol is gradually cooled and touches inside of the reaction kettle and the throttle plate, maltol is gradually solidified and adheres to unfolded surface inside the reaction kettle.

An upper part of the reaction kettle 1 is provided with four circular throttle plates 3 with enameled surface arranged at intervals up and down. Diameter of the throttle plate 3 matches inner diameter of the reaction kettle 1. The throttle plate 3 is a hollow plate, and an inner cavity of the throttle plate 3 is connected to the jacket 2. By setting the throttling plate, temperature of the air in the reaction kettle is lower, and the maltol can be coagulated. A middle part of each throttle plate 3 is provided with a first through hole 31 vertically penetrating through the throttle plate 3, and each throttle plate 3 is also provided with a number of second through holes 32 arranged around the first through hole 31. The first through hole on the throttle plate is mainly used to form accommodation space for the rotating shaft, and the second through hole is used for scraping off the maltol adhering to the throttle plate. The first through hole and the second through hole also form channels for gas to circulate in the reaction kettle. A motor 4 is arranged above the reaction kettle 1. A rotating shaft 41 of the motor 4 extends vertically downward into the reaction kettle 1, and passes through all first through holes 31 in sequence. With this arrangement, the rotating shaft does not affect the throttle plate. A lower end of the rotating shaft 41 is located at a bottom of the reaction kettle 1. The lower end of the rotating shaft 41 is provided with a stirring paddle 42. The stirring paddle 42 is made of stainless steel and covered with PTFE. A scraper 43 matching with the throttling plate 4 is provided at a position of the rotating shaft 41 corresponding to an upper side of each throttling plate 3. In the present application, the solidified maltol can be scraped off in time and step by step through the provided scraper and stirring paddle. In the case that condensation collecting layers inside the reaction kettle are multiple layers, the second through hole enables maltol above each one of condensation layers (throttle plate, bottom of the tank) to fall through it. By such setting, not only a multi-layered condensation space can be formed to avoid that the uncondensed maltol sublimation gas being sucked away by negative pressure under vacuum operation resulting in a decrease in production, but also maltol can be removed from the kettle in time without having to use a way of stopping and taking out material. The amount of maltol solidified on a side wall of the kettle and below the throttle plate is relatively small. As the amount of accumulation increases, when it is found that heat transfer is affected, the device can be shut down to fix. The fix can be done by passing high-temperature water vapor such that maltol that cannot be scraped off is gradually dissolved and flows out from the first through hole and the second through hole. After the cleaning is completed, the high-temperature water vapor is continuously introduced, then hot water is introduced into the jacket, and the vacuum pump is turned on to dry the inner wall of the kettle to complete the cleaning.

Embodiment Two

A cooling method for the cooling device of maltol sublimation section, comprising the following steps:

(1) introducing cooling water of −10° C. into an inner cavity of a throttle plate and a jacket through a condensate water inlet and a condensate water outlet, and starting a motor for stirring, while connecting a vacuum pump to a gas phase port to vacuumize a reaction kettle to ensure that vacuum degree in the reaction kettle is −0.08 MPa;

(2) starting sublimation in a sublimation kettle, introducing the sublimated material in gas phase directly into the reaction kettle through a gas phase inlet and holing for 4 h;

(3) introducing the sublimated material in gas phase into the reaction kettle and condensing it into solid material, scraping off the solid material adhered to an upper side of the throttle plate by a scraper such that the solid material falls into a bottom of the reaction kettle through a second through hole;

(4) finally, opening butterfly valve at a discharge port to release the solid material into a next process.

After testing, in the obtained solid material, impurity content is 2.5%.

Embodiment Three

A cooling method for the cooling device of maltol sublimation section, comprising the following steps:

(1) introducing cooling water of −12.5° C. into an inner cavity of a throttle plate and a jacket through a condensate water inlet and a condensate water outlet, and starting a motor for stirring, while connecting a vacuum pump to the gas phase port to vacuumize a reaction kettle to ensure that vacuum degree in the reaction kettle is −0.09 MPa;

(2) starting sublimation in a sublimation kettle, introducing the sublimated material in gas phase directly into the reaction kettle through a gas phase inlet and holing for 4 h;

(3) introducing the sublimated material in gas phase into the reaction kettle and condensing it into solid material, scraping off the solid material adhered to an upper side of the throttle plate by a scraper such that the solid material falls into a bottom of the reaction kettle through a second through hole;

(4) finally, opening butterfly valve at a discharge port to release the solid material into a next process.

After testing, in the obtained solid material, the impurity content is 1.7%.

Embodiment Four

A cooling method for the cooling device of maltol sublimation section, comprising the following steps:

(1) introducing cooling water of −15° C. into an inner cavity of the throttle plate and a jacket through a condensate water inlet and a condensate water outlet, and starting a motor for stirring, while connecting a vacuum pump to a gas phase port to vacuumize a reaction kettle to ensure that vacuum degree in the reaction kettle is −0.09 MPa;

(2) starting sublimation in a sublimation kettle, introducing the sublimated material in gas phase directly into the reaction kettle through a gas phase inlet and holing for 4 h;

(3) introducing the sublimated material in gas phase into the reaction kettle and condensing it into solid material, scraping off the solid material adhered to an upper side of the throttle plate by a scraper such that the solid material falls into a bottom of the reaction kettle through a second through hole;

(4) finally, opening butterfly valve at a discharge port to release the solid material into the next process.

Compared with passing maltol vapor into water so as to crystallize it, the method of the present application does not need to introduce water, thereby reducing the step of separating maltol from water. In addition, since the condensation is realized in a negative pressure state, the low-melting-point impurities generated during the sublimation process of maltol can be directly separated, which reduces the difficulty of separating impurities.

After testing, in the obtained solid material, impurity content is 1.6%.

In embodiments two, three and four, the impurity content of the obtained product is lower than 3%, and the impurity content is far lower than that of material obtained by adopting a mode that water absorbs sublimation gas. At the same time, energy consumption, water consumption and equipment usage are reduced.

The above described are only specific embodiments of the present application, under the above-mentioned teachings of the application, those skilled in the art can carry out other improvements or deformations on the basis of the above-mentioned embodiments. Those skilled in the art should understand that the above specific description is only to better explain the purpose of the present application, and the protection scope of the present application should be subject to the protection scope of the claims.

Furthermore, those skilled in the art can understand that although some embodiments described herein include some features included in other embodiments but not others, the combination of features of different embodiments means that they are within the scope of the present application and form different embodiments. For example, in the following claims, anyone of the claimed embodiments may be used in any combination.

What is claimed is:

1. A cooling device for a sublimation section is characterized in that, comprising a reaction kettle provided with an enameled inner wall, a top of the reaction kettle is provided with a gas phase port, a bottom of the reaction kettle is provided with a discharge port, a middle of the reaction kettle is provided with a sublimation gas phase inlet, and a wall of the reaction kettle is further provided with a jacket; wherein a throttle plate with enameled surface is provided in the reaction kettle, a middle of the throttle plate is provided with a first through hole passed vertically through the throttle plate, and the throttle plate are further provided with several second through holes arranged around the first through hole; wherein the throttle plate is a hollow plate, and an inner cavity in the throttle plate is connected to the jacket; wherein a rotating shaft extending downward from the top of the reaction kettle extends vertically downwards into the reaction kettle and passes through the first through hole, and a scraper matching in shape with the throttling plate is provided on a position of the rotating shaft corresponding to an upper side of each throttling plate, a lower end of the rotating shaft is provided with a stirring paddle.

2. The cooling device for the sublimation section according to claim 1, is characterized in that, the stirring paddle is made of stainless steel and coated with polytetrafluoroethylene outside, and a position of the rotating shaft corresponding to an upper side of each throttling plate is provided with a scraper matching in shape with the throttling plate.

3. The cooling device for the sublimation section according to claim 1, is characterized in that, the reaction kettle is in a cylindrical shape vertically arranged, the throttle plate is a circular plate, and the diameter of the throttle plate matches the inner diameter of the reaction kettle.

* * * * *